3,052,534
METHOD FOR PRODUCING HIGH-TEMPERATURE CEMENT IN THE BLAST FURNACE

John J. Bosley and Robert L. Stephenson, Pittsburgh, Pa., assignors to United States Steel Corporation, a corporation of New Jersey
No Drawing. Filed May 6, 1960, Ser. No. 27,275
3 Claims. (Cl. 75—41)

This invention relates to a method of producing iron and high alumina slag in a blast furnace and more particularly to producing high alumina slag suitable for use as a high aluminate cement when ground to the proper fineness. Such cements should have a CaO content of 35 to 45%, an $Al_2O_3$ content of 45 to 60%, an $SiO_2$ content below 8.0% and an iron content of less than 1%. Such cements have been produced in blast furnaces, but those methods of which we have knowledge have various disadvantages. One of the principal drawbacks of the methods employed is that there are operational difficulties in producing iron and slag in the furnace. Another drawback is that further processing of the slag produced is required to obtain the proper analysis before it can be used as cement. In some processes the iron produced is not entirely satisfactory. In a common German process it is necessary to add large amounts of metallic scrap to the blast furnace burden in order to absorb the large amount of silicon that must be reduced because of the large amount of coke that must be used in smelting. In about 25% of the slag produced the ratio of CaO to $Al_2O_3$ is not suitable such that it must be recharged into the blast furnace. Because of the high thermal requirements of the German method, the coke rate is too high for economic operation.

It is therefore an object of our invention to provide a method of producing iron and high alumina slag economically in a blast furnace.

Another object is to provide such a method which does not create difficulties in the operation of the blast furnace.

Still another object is to provide such a method which directly produces slag which is suitable for use as a high alumina cement.

These and other objects will be more apparent after referring to the following specification.

In the practice of our invention it is necessary to intimately premix the burden materials, except for the coke, and subject them to any suitable thermal agglomerating process, such as sintering or pelletizing, to drive off substantially all the combined moisture and $CO_2$. The premixed burden materials include an iron bearing material which may be a low silica iron ore, such as Venezuelan ore, an aluminum bearing material (preferably ferruginous), such as Grecian or Surinam bauxite, and a low-silica flux such as calcite stone. The iron bearing material, instead of being iron ore may be roll scale or a mixture of iron ore and roll scale. For best operation the silica content of the iron ore, the roll scale or the mixture thereof should not exceed 7% and when possible should be under 5%. The lower the silica content the better the results. The silica iron ratio of these iron bearing materials should be a maximum of 1/10. The $SiO_2/Al_2O_3$ ratio in the bauxite should be a maximum of 1/8 and the $SiO_2/CaO$ ratio in the flux a maximum of 1/25. The flux should contain a maximum of 2% silica. The proportions of the ingredients in the agglomerated mixture will vary according to the analysis of the materials available, but one skilled in the art will have no difficulty in selecting the correct percentages of the materials to obtain a sinter or other agglomeration having an alumina to lime ratio of approximately 1.3 and a minimum alumina silica ratio of 8.

The sinter obtained above is charged into a blast furnace along with the required coke and the furnace operated in the usual manner to produce iron and high alumina slag. The sinter preferably should comprise at least 75% of the iron-bearing burden, but preferably comprises 100% of such burden. Other materials which may constitute the rest of the iron-bearing burden are low silica iron ore, ferruginous bauxite, and scrap. The silica content of the coke should be as low as possible, but in no event should exceed 6%. The coke rate is preferably no greater than 1800 lb. per ton of hot metal produced, but the coke rate may go as high as 2200 lb. per t.h.m. and even to 2500 lb. when the silica in the coke is under 2%.

It should also be noted that ore of a higher silica content could be used if the coke has a very low (under 1%) silica content.

Example I

In one particular run in a blast furnace the raw materials used in the charge had the following analyses indicated in percentage by weight.

| Material | Fe | $SiO_2$ | $Al_2O_3$ | CaO | MgO | Loss on Ignition |
|---|---|---|---|---|---|---|
| Iron Ore | 64.1 | 0.7 | 1.0 | 0.1 | | 6.9 |
| Bauxite | 17.0 | 2.9 | 46.5 | 0.2 | | 25.3 |
| Coke | 0.6 | 2.7 | 2.0 | 0.5 | 0.2 | |
| Limestone | | 0.4 | 0.1 | 54.2 | 0.9 | |

In making up the sinter the ingredients are mixed in the following proportions.

| | lb./t.h.m. | Percent |
|---|---|---|
| Bauxite | 1,726 | 28.4 |
| Iron Ore | 2,712 | 44.6 |
| Limestone | 1,140 | 18.7 |
| Fuel (Coke) | 508 | 8.3 |
| Total | 6,086 | 100.0 |

This produces a sinter having the following analysis indicated in percentage by weight.

$Fe_3O_4$ ---------------------------------------- 58.2
$SiO_2$ ------------------------------------------ 2.0
$Al_2O_3$ ---------------------------------------- 18.7
CaO -------------------------------------------- 16.7
Other ------------------------------------------ 4.4

The blast furnace burden per ton of hot metal produced is made up of 3600 lb. of sinter, 600 lb. of ore, 40 lb. of limestone and 1700 lb. of coke.

For each ton of iron produced, 1500 lb. of slag was obtained. The iron contained 94% Fe, 1.25% Si, 3.50% C, and 1.25% minor ingredients. The slag contained 6.3% $SiO_2$, 50.6% $Al_2O_3$, 39.6% CaO, 0.9% MgO and 2.6% minor ingredients.

Example II

Another particular method involves raw materials having the following analysis.

| Material | Fe | $SiO_2$ | $Al_2O_3$ | CaO | MgO | LOI |
|---|---|---|---|---|---|---|
| Iron Ore | 63.3 | 1.5 | 2.0 | 0.4 | 0.1 | 6.5 |
| Bauxite | 17.0 | 2.9 | 46.5 | 0.2 | | 25.3 |
| Coke | 0.5 | 3.2 | 2.2 | 0.2 | 0.1 | |
| Limestone | 0.4 | 0.7 | 0.2 | 54.8 | 0.6 | |
| Sinter Fuel | 0.7 | 4.1 | 2.9 | 0.3 | 0.1 | |

The ingredients are mixed in the following proportions.

|  | lb./t.h.m. | Percent |
|---|---|---|
| Bauxite | 1,000 | 20.9 |
| Iron Ore | 2,688 | 56.2 |
| Stone | 739 | 15.4 |
| Fuel | 359 | 7.5 |
| Total | 4,786 | 100.0 |

This produces a sinter having the following analysis.

| | |
|---|---|
| $Fe_3O_4$ | 70.7 |
| $SiO_2$ | 2.4 |
| $Al_2O_3$ | 14.5 |
| CaO | 11.4 |
| MgO | 0.2 |
| Other | 0.8 |

The blast furnace burden per ton of hot metal produced is made up of 3662 lb. of sinter and 1515 lb. of coke.

For each ton of metal produced, 1130 lb. of slag is obtained. The iron contains 94% Fe, 1.25% Si, 4.00% C, and 0.75% minor ingredients. The slag contains 7.8% $SiO_2$, 49.9% $Al_2O_3$, 38.5% CaO, 0.8% MgO and 3.0% minor ingredients.

*Example III*

A further method involves raw materials having the following analysis.

| Material | Fe | $SiO_2$ | $Al_2O_3$ | CaO | MgO | LOI |
|---|---|---|---|---|---|---|
| Iron ore | 59.4 | 5.8 | 1.8 | 0.8 |  | 5.0 |
| Bauxite | 18.1 | 1.9 | 46.6 | 0.2 |  | 25.3 |
| Coke | 0.6 | 2.7 | 2.0 | 0.5 | 0.2 |  |
| Limestone |  | 0.4 | 0.1 | 54.2 | 0.9 |  |
| Scale | 70.0 | 2.4 | 0.7 | 0.5 | 0.2 |  |

The ingredients are mixed in the following proportions.

|  | lb./t.h.m. | Percent |
|---|---|---|
| Bauxite | 2,142 | 33.9 |
| Iron ore | 790 | 12.5 |
| Scale | 1,436 | 22.7 |
| Stone | 1,475 | 23.4 |
| Fuel | 470 | 7.5 |
| Total | 6,313 | 100.0 |

The produces a sinter having the following analysis.

| | |
|---|---|
| $Fe_3O_4$ | 56.5 |
| $SiO_2$ | 3.0 |
| $Al_2O_3$ | 21.9 |
| CaO | 17.3 |
| MgO | .3 |
| Other | 1.0 |

The blast furnace burden per ton of hot metal produced is made up of 3634 lb. of sinter and 1350 lb. of coke.

For each ton of metal produced, 2000 lb. of slag is obtained. The iron contains 94% Fe, 1.25% Si, 4.00% C, and 0.75% minor ingredients. The slag contains 7.4 $SiO_2$, 50.1% $Al_2O_3$, 37.7% CaO, 0.8% MgO and 4% minor ingredients.

*Example IV*

A fourth method involves raw materials having the following analysis.

| Material | Fe | $SiO_2$ | $Al_2O_3$ | CaO | MgO | LOI |
|---|---|---|---|---|---|---|
| Iron ore | 59.4 | 5.8 | 1.8 | 0.8 |  | 5.4 |
| Bauxite | 17.5 | 2.9 | 46.5 | 0.2 | 0.1 | 25.3 |
| Coke | 0.6 | 2.7 | 2.0 | 0.5 | 0.2 |  |
| Limestone |  | 0.4 | 0.1 | 54.2 | 0.9 |  |
| Scrap | 92.8 | 3.2 |  |  |  |  |

The ingredients are mixed in the following proportions.

|  | lb./t.h.m. | Percent |
|---|---|---|
| Bauxite | 2,220 | 41.6 |
| Iron ore | 1,045 | 19.6 |
| Stone | 1,650 | 30.8 |
| Fuel | 427 | 8.0 |
| Total | 5,342 | 100.0 |

This produces a sinter having the following analysis.

| | |
|---|---|
| $Fe_3O_4$ | 39.3 |
| $SiO_2$ | 3.8 |
| $Al_2O_3$ | 29.9 |
| CaO | 25.6 |
| MgO | .5 |
| Other | .9 |

The blast furnace burden per ton of hot metal produced is made up of 3525 lb. of sinter, 930 lb. of scrap, and 1500 lb. of coke.

For each ton of metal produced 2200 lb. of slag is obtained. The iron contains 94% Fe, 1.25% Si, 4.00% C, and 0.75% minor ingredients. The slag contains 6.8% $SiO_2$, 50.1% $Al_2O_3$, 40.5% CaO, 0.8% MgO and 1.8% minor ingredients.

While several embodiments of our invention have been described it will be apparent that other adaptations and modifications may be made without departing from the scope of the following claims.

We claim:

1. The method of producing iron and high-alumina slag which comprises providing a mixture of an iron bearing material of the class consisting of iron ore, iron scale and a mixture thereof, an aluminum bearing material and a low silica flux, heating and agglomerating said mixture to drive off substantially all combined moisture and $CO_2$, then charging said agglomerated mixture and coke having 6% maximum silica to a blast furnace, smelting said charge, and removing molten iron and slag from said blast furnace.

2. The method of producing iron and high-alumina slag which comprises providing a mixture of iron ore having 5% maximum silica, bauxite in which the $SiO_2/Al_2O_3$ ratio is 1/8 maximum, and limestone in which the $SiO_2/CaO$ ratio is 1/25 maximum, sintering said mixture to drive off substantially all combined moisture and $CO_2$, then charging said sinter and coke having 6% maximum silica to a blast furnace, smelting said charge, and removing molten iron and slag from said blast furnace.

3. The method of producing iron and high-alumina slag which comprises providing a mixture of a low silica iron bearing material of the class consisting of iron ore, iron scale and a mixture thereof, bauxite and a low silica flux, heating and agglomerating said mixture to drive off substantially all combined moisture and $CO_2$, the ingredients in said mixture being selected to produce a sinter having an alumina to lime ratio of approximately 1.3 and a maximum silica content of 3%, then charging said agglomerated mixture and coke having 6% maximum silica to a blast furnace, the coke rate being a maximum of 2200 lb. per ton of iron produced, smelting said charge, and removing molten iron and slag from said blast furnace.

References Cited in the file of this patent

FOREIGN PATENTS 162,315     Australia             Apr. 1, 1955